(12) United States Patent
Bakan et al.

(10) Patent No.: US 11,703,099 B2
(45) Date of Patent: Jul. 18, 2023

(54) WET FRICTION MATERIAL WITH QUATERNARY AMMONIUM SALTS

(71) Applicant: Schaeffler Technologies AG & Co. KG, Herzogenaurach (DE)

(72) Inventors: Murat Bakan, Wooster, OH (US); Rashid Farahati, Copley, OH (US); Michael Yanetta, Valley City, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/743,381

(22) Filed: May 12, 2022

(65) Prior Publication Data

US 2022/0268332 A1 Aug. 25, 2022

Related U.S. Application Data

(62) Division of application No. 16/838,197, filed on Apr. 2, 2020, now Pat. No. 11,333,214.

(51) Int. Cl.
*F16D 69/02* (2006.01)
*C08K 7/04* (2006.01)
*C08L 61/06* (2006.01)
*C08K 7/02* (2006.01)
*C08K 5/19* (2006.01)
*F16D 13/74* (2006.01)
*F16D 13/72* (2006.01)

(52) U.S. Cl.
CPC .............. *F16D 69/026* (2013.01); *C08K 5/19* (2013.01); *C08K 7/02* (2013.01); *C08K 7/04* (2013.01); *C08L 61/06* (2013.01); *F16D 13/72* (2013.01); *F16D 13/74* (2013.01); *F16D 2200/006* (2013.01); *F16D 2200/0034* (2013.01); *F16D 2200/0095* (2013.01)

(58) Field of Classification Search
CPC .................................................... F16D 69/026
See application file for complete search history.

(56) References Cited

U.S. PATENT DOCUMENTS

| | | | |
|---|---|---|---|
| 2018/0066202 A1* | 3/2018 | Gahagan | C10M 141/08 |
| 2019/0277359 A1* | 9/2019 | Farah | B32B 15/14 |

* cited by examiner

*Primary Examiner* — Vickey Nerangis
(74) *Attorney, Agent, or Firm* — Davidson, Davidson & Kappel, LLC

(57) ABSTRACT

A wet friction material includes a base including a matrix of fibers and filler particles embedded in the matrix of fibers; a binder embedded in an interior of the base; and a quaternary ammonium salt containing coating on an outer surface of the base. The quaternary ammonium salt containing coating can include a quaternary ammonium salt and a solution binder.

19 Claims, 4 Drawing Sheets

WET FRICTION MATERIAL WITH QUATERNARY AMMONIUM SALTS

The present disclosure relates generally to friction clutches and plates used in torque converters and motor vehicle transmissions and more specifically to wet friction material.

BACKGROUND

The friction material in wet-type friction clutches generally operates in an oil submerged environment and is often paper-based material used to form friction material rings. It is known to form the friction material by a paper making process using a Fourdrinier machine.

SUMMARY OF THE INVENTION

A method of making a wet friction material is provided. The method includes joining filler particles and fibers together and forming a base; coating an outer surface of the base with a quaternary ammonium salt containing solution; and drying the quaternary ammonium salt containing solution to form a quaternary ammonium salt containing coating on the outer surface of the base.

In exemplary embodiments, the method may further comprise, after drying the quaternary ammonium salt containing solution, saturating an interior of the base with a base binder. The quaternary ammonium salt containing solution may include a quaternary ammonium salt, a solution binder and water. The quaternary ammonium salt containing solution may further include filler particles. The quaternary ammonium salt containing solution may include 0.5 to 5.0% by weight of quaternary ammonium salt, 0.5 to 5.0% by weight of solution binder, 0 to 30% by weight of filler particles and 60 to 98% by weight of water. The coating of the outer surface of the base with the quaternary ammonium salt containing solution may include spraying, brushing or rolling the quaternary ammonium salt containing solution onto the outer surface of the base. The coating of the outer surface of the base with the quaternary ammonium salt containing solution may include spraying the quaternary ammonium salt containing solution onto the outer surface of the base, the quaternary ammonium salt containing solution including 0.5 to 2.5% by weight of QAS, 0.5 to 2.5% by weight of solution binder, 2.5 to 15% by weight of filler particles and 80 to 98% by weight of water. The coating of the outer surface of the base with the quaternary ammonium salt containing solution may include rolling or brushing the quaternary ammonium salt containing solution onto the outer surface of the base and the quaternary ammonium salt containing solution may include 2.0 to 5.0% by weight of QAS, 2.0 to 5.0% by weight of solution binder, 10 to 30% by weight of filler particles and 60 to 86% by weight of water. The quaternary ammonium salt containing coating may include 10 to 50% by weight of QAS, 10 to 50% by weight of solution binder and 0 to 80% by weight of filler particles. The quaternary ammonium salt containing coating may include 12.5 to 25% by weight of QAS, 12.5 to 25% by weight of solution binder and 50 to 75% by weight of filler particles. The solution binder may be a nano-cellulose, guar gum or an acrylic based emulsion.

A method of making a part of a friction clutch is also provided comprising making the wet friction material; and fixing the wet friction material to a metal part of the friction clutch, the coating the outer surface of the base with the quaternary ammonium salt containing solution and the drying the quaternary ammonium salt containing solution being performed before or after the fixing of the wet friction material to the metal part.

A wet friction material is also provided that includes a base including a matrix of fibers and filler particles embedded in the matrix of fibers; a binder embedded in an interior of the base; and a quaternary ammonium salt containing coating on an outer surface of the base.

In some exemplary embodiments of the wet friction material, the quaternary ammonium salt containing coating may include a quaternary ammonium salt and a solution binder. The quaternary ammonium salt containing coating may further include filler particles. The quaternary ammonium salt containing coating may include 10 to 50% by weight of QAS, 10 to 50% by weight of solution binder and 0 to 80% by weight of filler particles. The quaternary ammonium salt containing coating may include 12.5 to 25% by weight of QAS, 12.5 to 25% by weight of solution binder and 50 to 75% by weight of filler particles. The solution binder may be a nano-cellulose, guar gum or an acrylic based emulsion. The base may include a single layer. The base may include a support layer and an outer layer. The support layer may include a proportion of first fiber material and a proportion of first filler material. The outer layer may include a proportion of second fiber material and a proportion of second filler material. The proportion of second fiber material may be less than the proportion of first fiber material. The proportion of second filler material may be greater than the proportion of first filler material.

A clutch assembly is also provided including a metal part and the wet friction material on the metal part.

BRIEF DESCRIPTION OF THE DRAWINGS

The present disclosure is described below by reference to the following drawings, in which.

DETAILED DESCRIPTION

The present disclosure provides a method of forming a wet friction material that includes a quaternary ammonium salt (QASs) containing coating on an outer surface of the friction material. Such a coating may prevent glazing, which is a failure mechanism for friction material in a wet friction system that involves automatic transmission fluid components thermally degrading at high temperatures and then depositing on the outer surface of the friction material. Glazing results from the temperature on clutch surfaces increasing due to long slipping periods or high energy engagements, and leads to poor friction behavior as a result of decreasing friction material porosity. Friction materials that have a lower porosity may be more susceptible to glazing and benefit from a QAS containing coating on the outer surface.

QASs provide both friction modification and detergency. Adding QASs into friction material provides desired friction characteristics while keeping the surface clean from the degraded additive residues due to its detergency.

In one embodiment the QAS is quaternary ammonium salt that has alkyl chains with ~16 to 18 carbon atoms. For example, the QAS may be Arquad 2HT-75 which is a Di(hydrogenated tallowalkyl)dimethyl ammonium chloride.

Figure 1A:
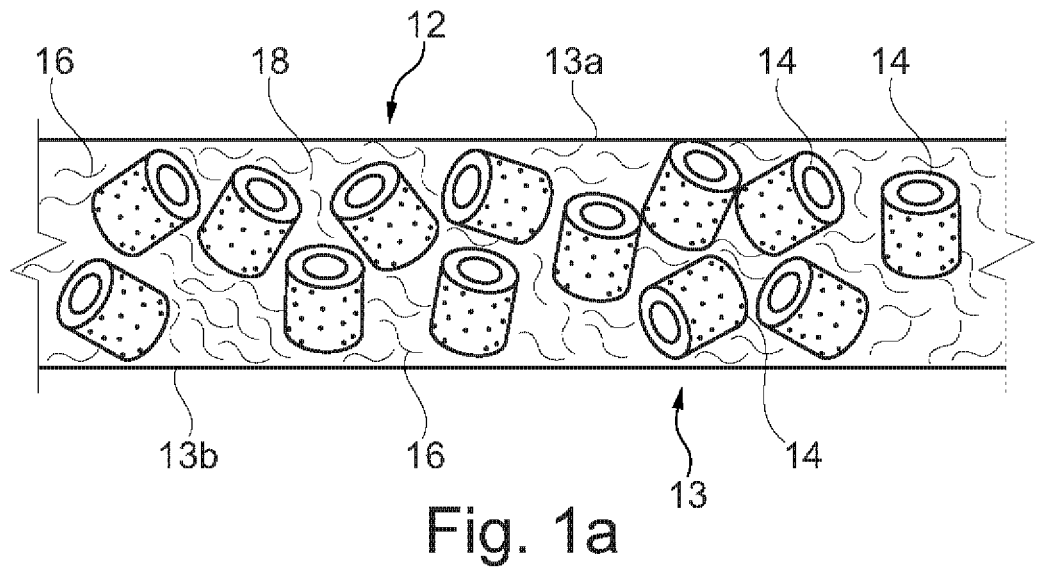
FIG. 1a schematically shows a base of a wet friction material according to embodiment.
Figure 1B:
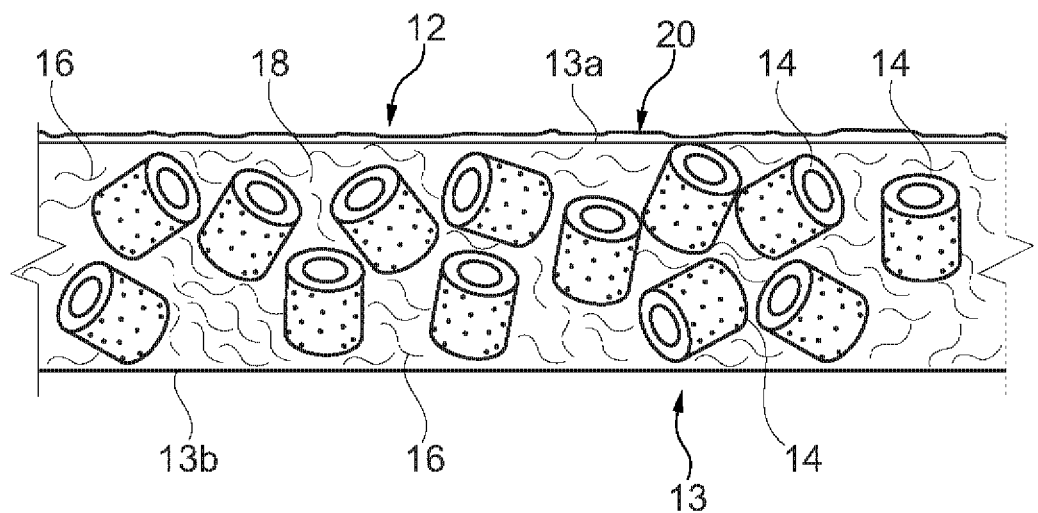
FIG. 1b schematically shows the base of the wet friction material in FIG. 1a with a QAS containing coating.

FIGS. 1a, 1b schematically illustrate a method of forming a wet friction material in accordance with an embodiment of the present disclosure.

A wet friction material 12 includes a base 13 formed of fibers, filler material and a base binder. The fibers can be aramid fibers, organic fibers, carbon fibers and/or fiberglass. The organic fibers may include cellulose fibers or cotton fibers. The filler material may be particles of diatomaceous earth. The base binder may be a phenolic resin. Optionally a friction modifier such as graphite may also be included in base 12. The fibers of 12 may have a mean diameter of 45 to 55 microns and a mean length of 1 to 2 millimeters.

In one preferred embodiment, base 13 may include, by percentage weight, 30 to 45% fibers, 25 to 35% filler material and 25 to 40% base binder. More specifically, wet friction material 12 may include, by percentage weight, 30 to 35% fibers, 30 to 35% filler material and 30 to 35% base binder.

FIG. 1a schematically shows wet friction material 12 before the base binder is added and before the QAS containing solution has been applied to base 13. Wet friction material 12 includes a material base formed by a plurality of diatomaceous earth particles 14 imbedded in a matrix of fibers 16 between a first outer surface— i.e., an upper outer surface 13a in the view of the figures— and a second outer surface 13b— i.e., a lower outer surface 13a in the view of the figures— of base 13.

Fibers 16 and particles 14 are joined together in a pulping process, which involves forming a mixture of the fibers 16 and particles 14 submerged together in a liquid solution, then drying the mixture to remove the liquid. After fibers 16 and particles 14 are joined together by the liquid solution, wet friction material 12 includes a matrix formed by fibers 16 and diatomaceous earth particles 14 that define a network of voids 18.

As schematically shown in FIG. 1b, after fibers 16 and particles 14 are joined together, a QAS containing solution is applied to base 13 to form a QAS containing coating 20 on the particles 14 and fibers 16 at the outer surface 13a of base 13. QAS containing coating 20 may be applied by spraying, rolling or brushing onto outer surface 13a. During application of QAS containing coating 20, the QAS containing solution also may drip down into base 13, covering at least some of particles 14 and fibers 16 in an interior of base that is formed between outer surfaces 13a, 13b with the QAS containing solution and decreasing the size of at least some of voids 18. QAS containing coating 20 thus covers at least outer surface 13a, which is defined as a surface in plane of base 13 that contacts a planar surface that is pressed onto base 13. For example, the planar surface may be considered as being a part which friction material 12 is pressed against for frictional engagement or which is pressed against frictional material 12 for frictional engagement.

The QAS containing solution may include a QAS, a binder and optionally filler particles. The binder in the solution is referred to herein as a solution binder to distinguish from the binder that is added to the base 14, which is referred to herein as a base binder. The solution binder may be a nano-cellulose, such as for example carboxy methyl cellulose sodium, guar gum or an acrylic based emulsion. The filler particles may be diatomaceous earth. The QAS containing solution may include 0.5 to 5.0% by weight of QAS, 0.5 to 5.0% by weight of solution binder, 0 to 30% by weight of filler particles and 60 to 98% by weight of water. The amount of water used in the solution may depend on the method of application. For example, rolling or brushing may require approximately ⅙ to ¼ the amount of water as spraying. For rolling or brushing, the QAS containing solution may include 2.0 to 5.0% by weight of QAS, 2.0 to 5.0% by weight of solution binder, 10 to 30% by weight of filler particles and 60 to 86% by weight of water. For spraying, the QAS containing solution may include 0.5 to 2.5% by weight of QAS, 0.5 to 2.5% by weight of solution binder, 2.5 to 15% by weight of filler particles and 80 to 98% by weight of water.

After the QAS containing solution is applied to the base 13, the water is removed by drying the QAS containing solution to finalize the formation of QAS containing coating 20, which defines an upper outer surface 12a of wet friction material 12. The drying may be performed by hot air blow drying or drying via heated plates. In either case, the paper surface reaches a temperature of 90 to 110° C. QAS coating layer 20, after drying, may include 10 to 50% by weight of QAS, 10 to 50% by weight of solution binder and 0 to 80% by weight of filler particles. In some embodiments, QAS coating layer 20, after drying, may include 12.5 to 25% by weight of QAS, 12.5 to 25% by weight of solution binder and 50 to 75% by weight of filler particles.

A base binder, for example in the form of phenolic resin, is added to wet friction material 12 after QAS coating layer 20 is applied to base 13. The base binder penetrates past outer surface 13a into the interior of the wet friction material 12 such that voids 18 in the interior of wet friction material 12 are saturated with the water based phenolic resin 20, but the outer surface 12a defined by QAS coating layer 20 is exposed.

Figure 2:
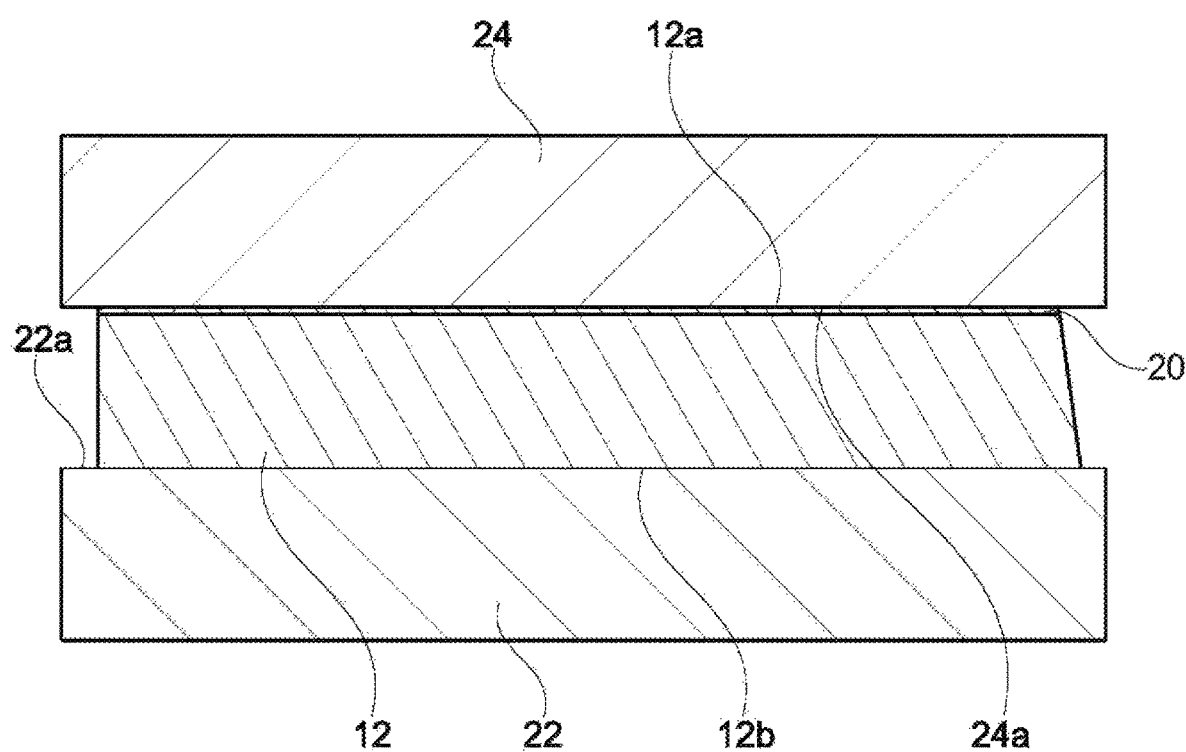
FIG. 2 shows the wet friction material being joined on top of a metal part via a heat plate.

As shown in FIG. 2, wet friction material 12 is then placed on top of a metal part 22 and 12 and part 22 are joined together to form a friction assembly. The joining of 12 and part 22 together includes pressing wet friction material 12 against metal part 22 with a heat plate 24 to cure the phenolic resin in wet friction material 12, fixing wet friction material 12 and metal part 22 together. The force of pressing of heat plate 24 against outer surface 12a of wet friction material 12, while a lower outer surface 12b of wet friction material 12 rests on an outer surface 22a of metal part 22, cures the phenolic resin by the heat of heat plate 24. The curing of the phenolic resin solidifies and hardens wet friction material 12 to fix fibers 16 and particles 14 in place, which improves the strength of the wet friction material 12. An adhesive film applied between surfaces 12b and 22a creates a permanent connection between metal part 22 and wet friction material 12 due to time, temperature and pressure applied. In one preferred embodiment, the heat at a surface 24a of plate 24 that contacts outer surface 12a of outer layer is 375 to 425 degrees F., while leaving QAS coating layer 20 intact.

In another embodiment, instead of applying the QAS containing solution to the base 13 prior to adding the base resin to base 13 and prior to bonding the wet friction material 12 to the metal part 22, the QAS containing solution is applied to wet friction material 12 after adding the base resin to base 13 and after bonding the wet friction material 12 to the metal part 22. In one exemplary application, a QAS containing solution of 2 to 10% by weight of QAS and 90 to 98% by weight of water, without filler particles and binder, is applied to wet friction material 12 after adding the base resin to base 13 and after bonding the wet friction material 12 to the metal part 22, and then the water is dried out. More specifically, a QAS containing solution of 5 to 10% by weight of QAS and 90 to 95% by weight of water may be used.

Figure 3:
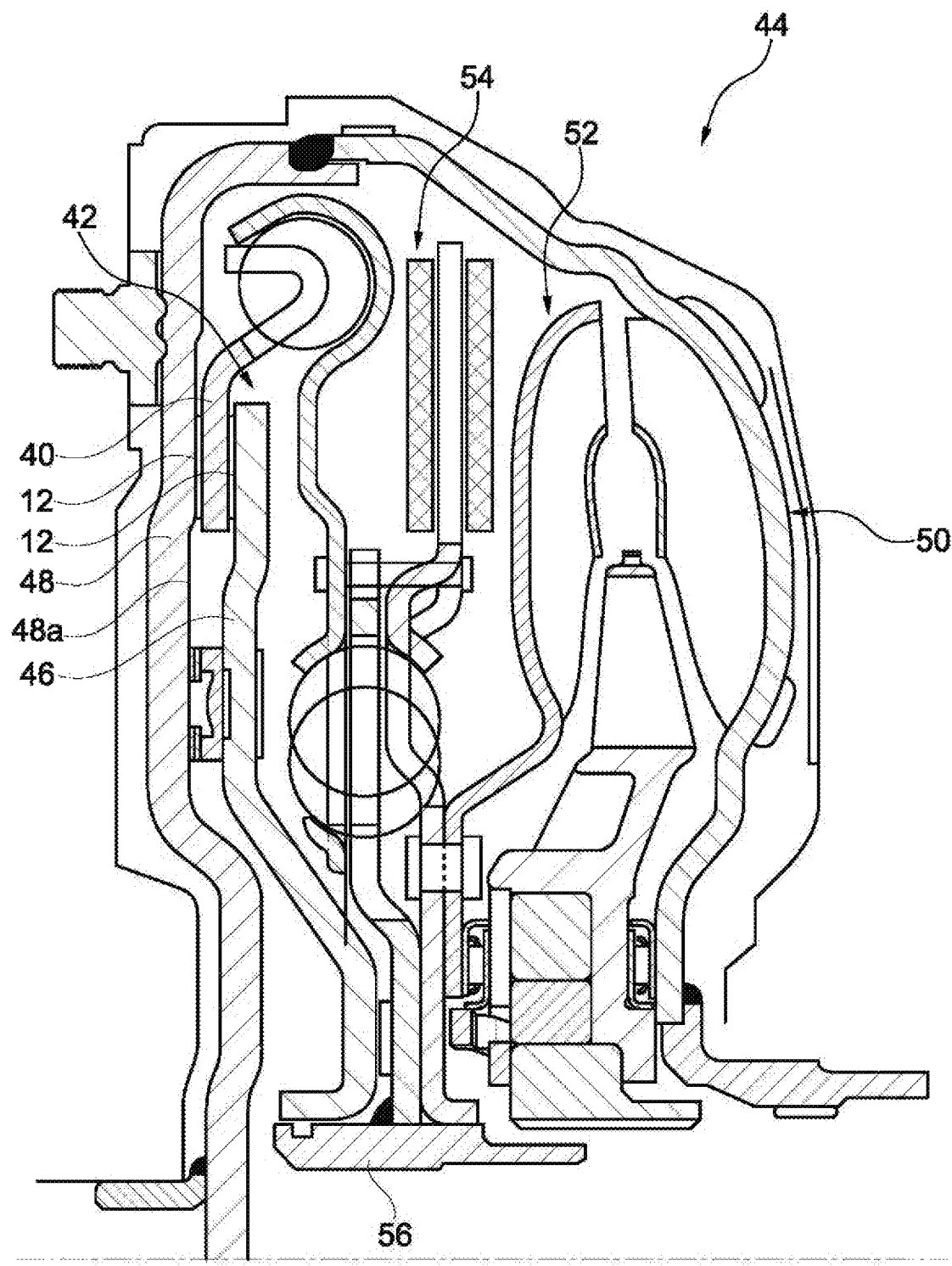
FIG. 3 shows a wet friction material bonded to both sides of a clutch plate of lockup clutch assembly of a torque converter.

FIG. 3 shows wet friction material 12 bonded to both sides of a metal part in the form of a clutch plate 40 of lockup clutch assembly 42 of a torque converter 44. A piston 46 of lockup clutch assembly 42 forces clutch plate 40 against an inside surface 48a of a front cover 48 of torque converter 44. Piston 46 contacts the surface 12a of the rear piece of wet friction material 42 to force the surface 12a on the front piece of wet friction material 12 against inside surface 48a of front cover 48. The forcing of clutch plate 40 against front cover 48 by piston 46 locks the lockup clutch assembly 42 such that a torque path in torque converter 44 to a transmission input shaft bypasses an impeller 50 and a turbine 52 of torque converter 44, and instead flows from front cover 48 to clutch plate 40 and through a damper assembly 54 to a transmission input shaft that is connected to an output hub 56 of torque converter 44.

Figure 4:
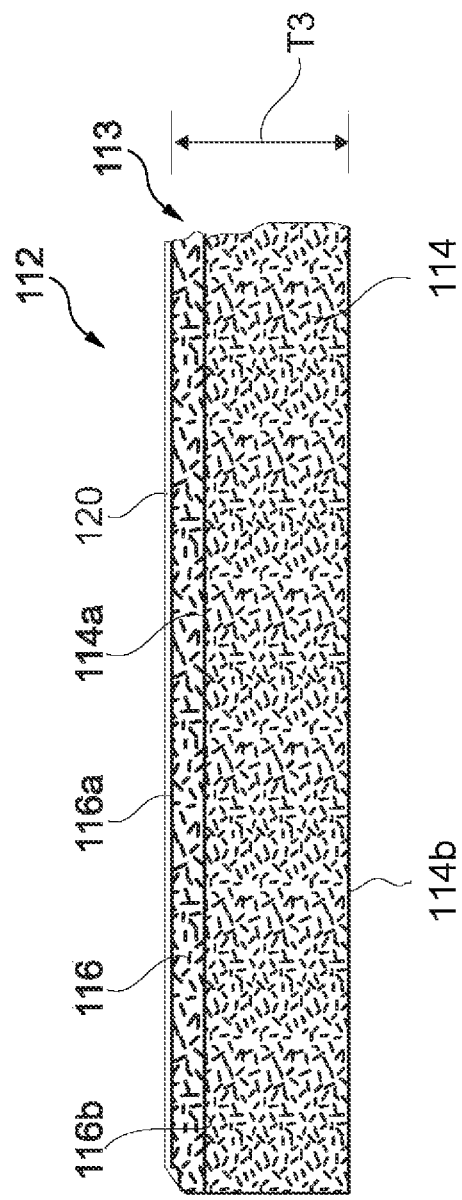
FIG. 4 shows a double layer wet friction material in accordance with another embodiment of the invention.

FIG. 4 shows a double layer wet friction material 112 in accordance with another embodiment of the invention. Double layer wet friction material 112 includes a base 113 formed by a support layer 114 and an outer layer 116. Base 113 is formed such that support layer 114 has a thickness T1 between an upper outer surface 114a and lower outer surface 114b, outer layer 116 has a thickness T2 between upper outer surface 116a and lower outer surface 116b, and wet friction material 112 has a total thickness T3 between outer surface 116a and outer surface 114b. In one preferred embodiment, the thickness T2 of outer layer 116 is equal 10 to 30% of the total thickness T3, with thickness T1 of support layer 114 thus being 70 to 90% of the total thickness T3.

Support layer 114 is a wet friction material formed of fibers, filler material and a base binder. In one preferred embodiment, the fibers are 60 to 100% by percentage weight synthetic fibers, for example aramid fibers, but can also include cellulose fibers, carbon fibers and/or fiberglass. In another preferred embodiment, the fibers are 75 to 90% by percentage weight synthetic fibers. Cellulose fibers can be in cotton linter or wood pulp form. The fillers can be diatomaceous earth and/or clay. The base binder can be a phenolic resin, a latex or a silane. Optionally a friction modifier such as graphite may also be included in base layer 10.

Outer layer 116 includes fibers, filler material and a base binder. The fibers may consist of cellulose fibers. The fillers consist of cylindrical, random or disc-shaped diatomaceous earth. In one preferred embodiment, the diatomaceous earth particles have a mean diameter of 5 to 40 microns. The base binder can be a phenolic resin, a latex or a silane. Optionally a friction modifier such as graphite may also be included in outer layer 116. The composition of outer layer 116 includes a higher ratio of filler material and a lower ratio of fibers than support layer 114, such that outer layer 116 is less porous and more dense than support layer 114, has a higher coefficient of friction than support layer 114 and a higher wear resistance than support layer 114. The fibers of layers 114 and 116 have a mean diameter of 25 to 35 microns and a mean length of 1 to 2 millimeters.

In some preferred embodiments, support layer 114 includes, by percentage weight, 35 to 60% fibers, 15 to 40% filler material and 20 to 30% base binder. More specifically, for higher temperature applications, base layer sheet may include, by percentage weight, 35 to 55% aramid fibers, 15 to 40% filler, which in some preferred embodiments consists only of diatomaceous earth, and 25 to 35% base binder.

Outer layer 116 consists of 35 to 55% diatomaceous earth, 15 to 40% cellulose fiber and 20 to 30% base binder.

Wet friction material 112 also includes a QAS containing layer 120 on outer surface 116a of outer layer 116. As similarly described above, a QAS containing solution can be applied to outer layer 116 to form QAS containing coating 120 on the particles and fibers at the outer surface 116a of outer layer 116 of base 113. As similarly described above, the QAS containing solution can be applied prior to adding the base resin to base 113 and prior to bonding the wet friction material 112 to the metal part, or the QAS containing solution can be applied to wet friction material 112 after adding the base resin to base 113 and after bonding the wet friction material 112 to the metal part.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 12 wet friction material
12a upper outer surface
12b lower outer surface
13 base
13a upper outer surface
13b lower outer surface
14 particles
16 fibers
18 voids
20 QAS containing coating
22 metal part
22a outer surface
24 heat plate
24a surface
40 clutch plate
42 lockup clutch assembly
42 lockup clutch assembly
44 torque converter
46 piston
48 front cover
48a inside surface
50 impeller
52 turbine
54 damper assembly
56 output hub
112 double layer wet friction material
113 base
114 support layer
114a upper outer surface
114b lower outer surface
116 outer layer
116a upper outer surface
116b lower outer surface
120 QAS containing layer
T1 support layer thickness
T2 outer layer thickness
T3 total thickness

What is claimed is:

1. A wet friction material comprising:
a base including a matrix of fibers and filler particles embedded in the matrix of fibers;
a binder embedded in an interior of the base; and
a quaternary ammonium salt containing coating on an outer surface of the base, wherein the quaternary ammonium salt containing coating includes a quaternary ammonium salt and a solution binder.

2. The wet friction material as recited in claim 1 wherein the quaternary ammonium salt containing coating further includes filler particles.

3. The wet friction material as recited in claim 2 wherein the quaternary ammonium salt containing coating includes 10 to 50% by weight of quaternary ammonium salt, 10 to 50% by weight of solution binder and 0 to 80% by weight of filler particles.

4. The wet friction material as recited in claim 3 wherein the quaternary ammonium salt containing coating includes 12.5 to 25% by weight of quaternary ammonium salt, 12.5 to 25% by weight of solution binder and 50 to 75% by weight of filler particles.

5. The wet friction material as recited in claim 1 wherein the solution binder is a nano-cellulose, guar gum or an acrylic based emulsion.

6. The wet friction material as recited in claim 1 wherein the base includes:
a single layer; or
a support layer and an outer layer, the support layer including a proportion of first fiber material and a proportion of first filler material, the outer layer including a proportion of second fiber material and a proportion of second filler material, the proportion of second fiber material being less than the proportion of first fiber material, the proportion of second filler material being greater than the proportion of first filler material.

7. The wet friction material as recited in claim 6 wherein the base is the single layer and includes, by percentage weight, 30 to 45% fibers, 25 to 35% filler particles and 25 to 40% binder.

8. The wet friction material as recited in claim 6 wherein the base is the single layer and includes, by percentage weight, 30 to 35% fibers, 30 to 35% filler particles and 30 to 35% binder.

9. The wet friction material as recited in claim 6 wherein the base includes the support layer and the outer layer, the support layer including, by percentage weight, 35 to 60% fibers, 15 to 40% filler material and 20 to 30% base binder, the outer layer including, by percentage weight, 35 to 55% diatomaceous earth, 15 to 40% cellulose fiber and 20 to 30% binder.

10. The wet friction material as recited in claim 9 wherein the support layer includes, by percentage weight, 35 to 55% aramid fibers, 15 to 40% filler, and 25 to 35% binder.

11. The wet friction material as recited in claim 1 wherein the quaternary ammonium salt has alkyl chains with 16 to 18 carbon atoms.

12. The wet friction material as recited in claim 1 wherein the quaternary ammonium salt is a Di(hydrogenated tallow-alkyl)dimethyl ammonium chloride.

13. The wet friction material as recited in claim 1 wherein the fibers are aramid fibers, cellulose fibers, cotton fibers, carbon fibers and/or fiberglass.

14. The wet friction material as recited in claim 1 wherein the filler particles are diatomaceous earth and the binder is a phenolic resin.

15. The wet friction material as recited in claim 1 wherein the fibers have a mean diameter of 25 to 35 microns and a mean length of 1 to 2 millimeters.

16. The wet friction material as recited in claim 1 wherein the filler particles include diatomaceous earth particles having a mean diameter of 5 to 40 microns.

17. The wet friction material as recited in claim 1 wherein the filler particles consist of diatomaceous earth particles having a mean diameter of 5 to 40 microns.

18. The wet friction material as recited in claim 1 wherein the fibers are 60 to 100% by percentage weight synthetic fibers.

19. A clutch assembly comprising:
a metal part; and
the wet friction material as recited in claim 1 fixed on the metal part.

* * * * *